United States Patent
Ho (10) Patent No.: US 10,656,738 B1
(45) Date of Patent: May 19, 2020

(54) TOUCH PANEL AND MANUFACTURING METHOD THEREOF

(71) Applicants: Interface Technology (ChengDu) Co., Ltd., Sichuan (CN); Interface Optoelectronics (ShenZhen) Co., Ltd., Guangdong (CN); General Interface Solution Limited, Miaoli County (TW)

(72) Inventor: Yi-Hung Ho, Guangdong (CN)

(73) Assignees: INTERFACE TECHNOLOGY (CHENGDU) CO., LTD., Sichuan (CN); INTERFACE OPTOELECTRONICS (SHENZHEN) CO., LTD., Guangdong (CN); GENERAL INTERFACE SOLUTION LIMITED, Miaoli County (TW)

( * ) Notice: Subject to any disclaimer, the term of this patent is extended or adjusted under 35 U.S.C. 154(b) by 0 days.

(21) Appl. No.: 16/240,804

(22) Filed: Jan. 7, 2019

(30) Foreign Application Priority Data

Dec. 4, 2018 (CN) .......................... 2018 1 1472352

(51) Int. Cl.
*H01L 23/48* (2006.01)
*G06F 3/041* (2006.01)

(52) U.S. Cl.
CPC ..... *G06F 3/041* (2013.01); *G06F 2203/04103* (2013.01); *G06F 2203/04106* (2013.01)

(58) Field of Classification Search
None
See application file for complete search history.

(56) References Cited

U.S. PATENT DOCUMENTS

| | | | |
|---|---|---|---|
| 2006/0071347 A1* | 4/2006 | Dotta | H01L 21/486 257/781 |
| 2008/0303170 A1* | 12/2008 | Tanida | H01L 23/481 257/774 |
| 2009/0002205 A1* | 1/2009 | Klinghult | G06F 3/016 341/33 |
| 2012/0062505 A1* | 3/2012 | Kim | B82Y 15/00 345/174 |
| 2018/0210587 A1* | 7/2018 | Zhang | G06F 3/0412 |
| 2019/0064954 A1* | 2/2019 | Ho | G06F 3/0416 |

* cited by examiner

*Primary Examiner* — Shamim Ahmed
(74) *Attorney, Agent, or Firm* — CKC & Partners Co., LLC (57) ABSTRACT

A touch panel includes at least one touch sensing layer, a first metal layer, a second metal layer, a through hole, a metal film, and a conductive structure. The first and second metal layers are respectively located above and below the touch sensing layer. The through hole penetrates through the first metal layer, the touch sensing layer, and the second metal layer. The through hole has a first opening and a second opening. The metal film is on a bottom surface of the second metal layer and covers the second opening of the through hole. The conductive structure is located on the metal film and in the through hole. An end of the conductive structure adjacent to the first opening has a microstructure. The microstructure extends to a top surface of the first metal layer and surrounds the first opening of the through hole.

2 Claims, 7 Drawing Sheets

TOUCH PANEL AND MANUFACTURING METHOD THEREOF

RELATED APPLICATIONS

This application claims priority to China Application Serial Number 201811472352.1, filed Dec. 4, 2018, which is herein incorporated by reference.

BACKGROUND

Field of Invention

The present disclosure relates to a touch panel and a manufacturing method of the touch panel.

Description of Related Art

In general, a touch panel can be designed by combining gesture-touch, hovering-touch with different capacitive-touch or resistive-touch sensing layers, and connecting electric circuits of respective layers to achieve various functions. The electric circuits of the respective layers can be connected by forming a through hole in the touch panel, and filling the through hole with a silver paste, such that the electric circuits of the respective layers can be conducted through the silver paste.

However, the filling of the silver paste is difficult to be controlled due to the fluidity of the material, and bubbles are likely to be generated during the filling. In addition, the boundaries between the silver paste and the touch panel, such as the top portion and bottom portion of the silver paste, have poor water-blocking and gas-blocking properties, thus failing to pass subsequent reliability tests. Furthermore, connections between portions of the silver paste and upper and lower conductive pads of the touch panel are easily broken, thus causing low yield and long processing time.

SUMMARY

An aspect of the present disclosure is to provide a touch panel.

According to an embodiment of the present disclosure, a touch panel includes at least one touch sensing layer, a first metal layer, a second metal layer, a through hole, a metal film, and a conductive structure. The first and the second metal layers are respectively located above and below the touch sensing layer. The through hole penetrates through the first metal layer, the touch sensing layer, and the second metal layer. The through hole has a first opening adjacent to the first metal layer and a second opening adjacent to the second metal layer. The metal film is on a bottom surface of the second metal layer and covers the second opening of the through hole. The conductive structure is located on the metal film and in the through hole. An end of the conductive structure adjacent to the first opening has a microstructure. The microstructure extends to a top surface of the first metal layer and surrounds the first opening of the through hole.

In an embodiment of the present disclosure, the touch panel further includes a transparent conductive layer located between the first metal layer and the touch sensing layer.

In an embodiment of the present disclosure, the touch panel further includes a transparent conductive layer located between the second metal layer and the touch sensing layer.

In an embodiment of the present disclosure, the touch panel has two touch sensing layers, and the touch panel further includes a third metal layer located between the two touch sensing layers.

In an embodiment of the present disclosure, the touch panel further includes a transparent conductive layer located between the third metal layer and one of the two touch sensing layers.

In an embodiment of the present disclosure, the touch panel further includes an adhesive layer located between the third metal layer and one of the two touch sensing layers.

In an embodiment of the present disclosure, the first metal layer of the touch panel is located on a top surface of one of the two touch sensing layers, and the second metal layer is located on a bottom surface of the other of the two touch sensing layers.

In an embodiment of the present disclosure, the width of the metal film of the touch panel is in a range from 1.5 times of the diameter of the through hole to 2 times of the diameter of the through hole.

Another aspect of the present disclosure is to provide a manufacturing method of a touch panel.

According to an embodiment of the present disclosure, a manufacturing method of a touch panel includes the following steps of: forming a through hole penetrating through a first metal layer, at least one touch sensing layer, and a second metal layer, in which the through hole has a first opening adjacent to the first metal layer and a second opening adjacent to the second metal layer; disposing a metal film on the second metal layer to cover the second opening of the through hole; disposing the first metal layer on a mask, in which the mask has a third opening, and the through hole is located in the third opening, and a portion of the first metal layer surrounding the first opening is exposed through the third opening; forming a conductive structure on the metal film, in the through hole, and on the portion of the first metal layer, such that an end of the conductive structure adjacent to the first opening has a microstructure, and the microstructure extends to the first metal layer and surrounds the first opening of through hole; and removing the mask.

In an embodiment of the present disclosure, forming the conductive structure on the metal film, in the through hole, and on the portion of the first metal layer includes forming a material including silver and silicon oxide on the metal film, in the through hole, and on the portion of the first metal layer by vapor deposition.

In the aforementioned embodiments of the present disclosure, since the metal film is first disposed on the second metal layer, and the first metal layer is disposed on the mask having the third opening, such that the portion of the first metal layer surrounding the through hole is exposed through the third opening, the conductive structure not only may be formed on the metal film and in the through hole, but also may form a microstructure on the exposed portion of the first metal layer. The conductive structure having the microstructure not only may achieve the effect of conducting between the metal layers, but also may prevent the generation of bubbles. Furthermore, the conductive structure having the microstructure can also effectively block off water and gas, and would not be disconnected easily from the upper and the lower metal layers, thereby increasing yield and reliability, and shortening processing time, thus reducing production cost.

BRIEF DESCRIPTION OF THE DRAWINGS

The disclosure can be more fully understood by reading the following detailed description of the embodiments, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

Figure 1:
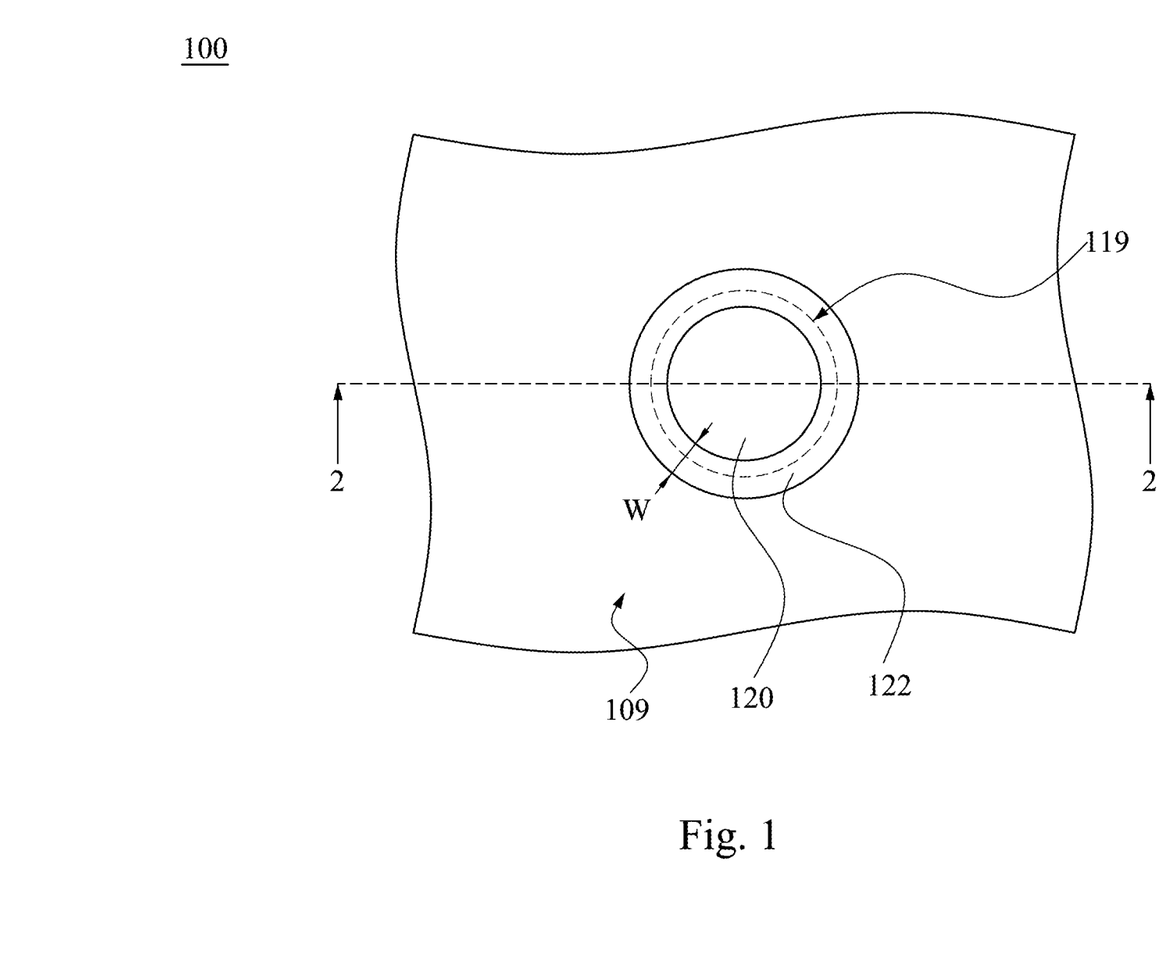
FIG. 1 illustrates a top view of a touch panel according to an embodiment of the present disclosure.
Figure 2:
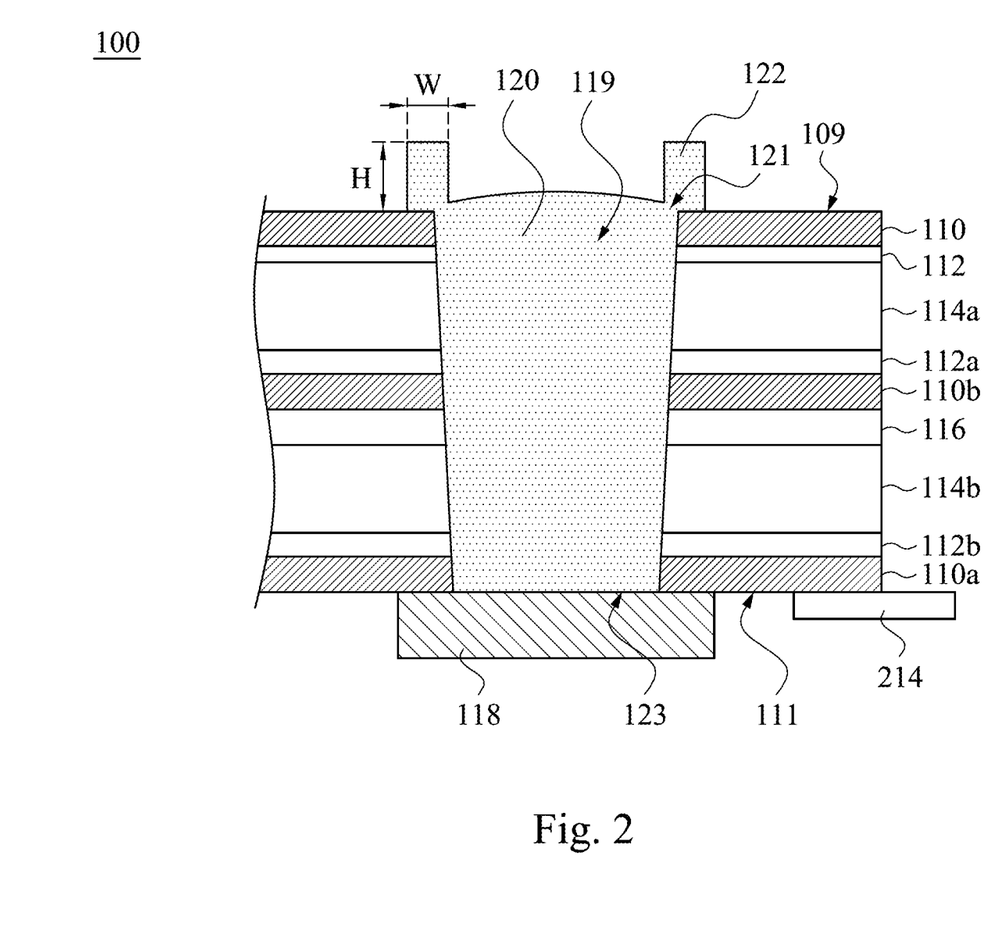
FIG. 2 illustrates a cross-sectional view of the touch panel taken along line 2-2 shown in FIG. 1.

FIG. 1 illustrates a top view of a touch panel 100 according to an embodiment of the present disclosure. FIG. 2 illustrates a cross-sectional view of the touch panel 100 taken along line 2-2 shown in FIG. 1. As shown in FIG. 1 and FIG. 2, the touch panel 100 includes a first metal layer 110, a touch sensing layer 114a, a second metal layer 110a, a through hole 119, a metal film 118, and a conductive structure 120.

The first metal layer 110 is located above the touch sensing layer 114a, and the second metal layer 110a is located below the touch sensing layer 114a. The through hole 119 penetrates through the first metal layer 110, the touch sensing layer 114a, and the second metal layer 110a. The through hole 119 has a first opening 121 adjacent to the first metal layer 110 and a second opening 123 adjacent to the second metal layer 110a. The metal film 118 is located on a bottom surface 111 of the second metal layer 110a and covers the second opening 123 of the through hole 119. The conductive structure 120 is located on the metal film 118 and in the through hole 119. The conductive structure 120 has a microstructure 122 adjacent to an end of the first opening 121, such as a top end of the conductive structure 120 of FIG. 2. The microstructure 122 extends to a top surface 109 of the first metal layer 110 and surrounds the first opening 121 of the through hole 119.

Since the metal film 118 is disposed on the bottom surface 111 of the second metal layer 110a and covers the second opening 123 of the through hole 119 and the microstructure 122 is located on the top surface 109 of the first metal layer 110 to which the conductive structure 120 extends, the conductive structure 120 having the microstructure 122 not only may achieve the effect of conducting between the metal layers (for example, the first metal layer 110 and the second metal layer 110a), but also may prevent the generation of bubbles and block off water and gas. Because the microstructure 122 and the metal film 118 are provided, the touch panel 100 of the present disclosure would not be easily disconnected from the upper first metal layers 110 and the lower second metal layer 110a.

In the present embodiment, the metal film 118 is made of a material including copper, and the thickness of the metal film 118 may be about 10 micrometers, but the present disclosure is not limited in this regard. The width of the metal film 118 may be in a range from 1.5 time of the diameter of the through hole 119 to 2 times of the diameter of the through hole 119, such that the metal film 118 may completely cover the second opening 123 of the through hole 119 and be easily bridged over the second metal layer 110a.

The conductive structure 120 of the touch panel 100 may be made of a material including silver and silicon oxide. In other embodiments, the conductive structure 120 may include copper or gold, but the present disclosure is not limited in this regard as long as the material has low resistance and is easily deposited. In the present embodiment, the conductive structure 120 may have a thickness from about 100 micrometers to about 200 micrometers to maintain the conduction capability. The thickness H of the microstructure 122 of the conductive structure 120 may be more than 3 micrometers and be greater than the top surface 109 of the first metal layer 110 by about 10 micrometers to 20 micrometers. Furthermore, the width W of the microstructure 122 may be from about 3 micrometers to 6 micrometers. By using the above-mentioned conductive structure 120 having the microstructure 122, the effect of blocking water and gas can be achieved, and the touch panel 100 can be easily adhered to upper items subsequently attached.

In the present embodiment, the touch panel 100 has two touch sensing layers 114a and 114b. The touch sensing layers 114a and 114b may have different functions, such as gesture-touch, hovering-touch, capacitive-touch, resistive-touch, and the like. The first metal layer 110 is located on the top surface of the touch sensing layer 114a, and the second metal layer 110a is located on the bottom surface of the touch sensing layer 114b.

The touch panel 100 further includes a third metal layer 110b, and the third metal layer 110b is located between the touch sensing layer 114a and the touch sensing layer 114b. In the present embodiment, the first metal layer 110, the second metal layer 110a, and the third metal layer 110b surround the sidewall of the through hole 119. The first metal layer 110, the second metal layer 110a, and the third metal layer 110b are in contact with the conductive structure 120 and are electrically connected to each other. The touch panel 100 further includes transparent conductive layers 112, 112a, and 112b. The transparent conductive layer 112 is located between the first metal layer 110 and the touch sensing layer 114a, the transparent conductive layer 112a is located between the third metal layer 110b and the touch sensing layer 114a, and the transparent conductive layer 112b is located between the second metal and the touch sensing layer 114b. Although FIG. 2 illustrates two touch sensing layers 114a and 114b, three transparent conductive layers 112, 112a, and 112b, and a third metal layer 110b, the number of the touch sensing layer, the transparent conductive layer, and the third metal layer in the present disclosure is not limited in this regard.

In the present embodiment, the touch panel 100 further includes an adhesive layer 116, in which the adhesive layer 116 is located between the third metal layer 110b and the touch sensing layer 114b, and may be used to adhere the third metal layer 110b to the touch sensing layer 114b. In the present embodiment, the touch panel 100 is electrically connected to a flexible circuit board 214 located on the bottom surface 111 of the second metal layer 110a for electrically connecting to other electronic components.

It is noted that the connection relationships, the materials, and the advantages of the elements described above will not be repeated. In the following description, a manufacturing method of a touch panel 100 will be described.

Figure 3:
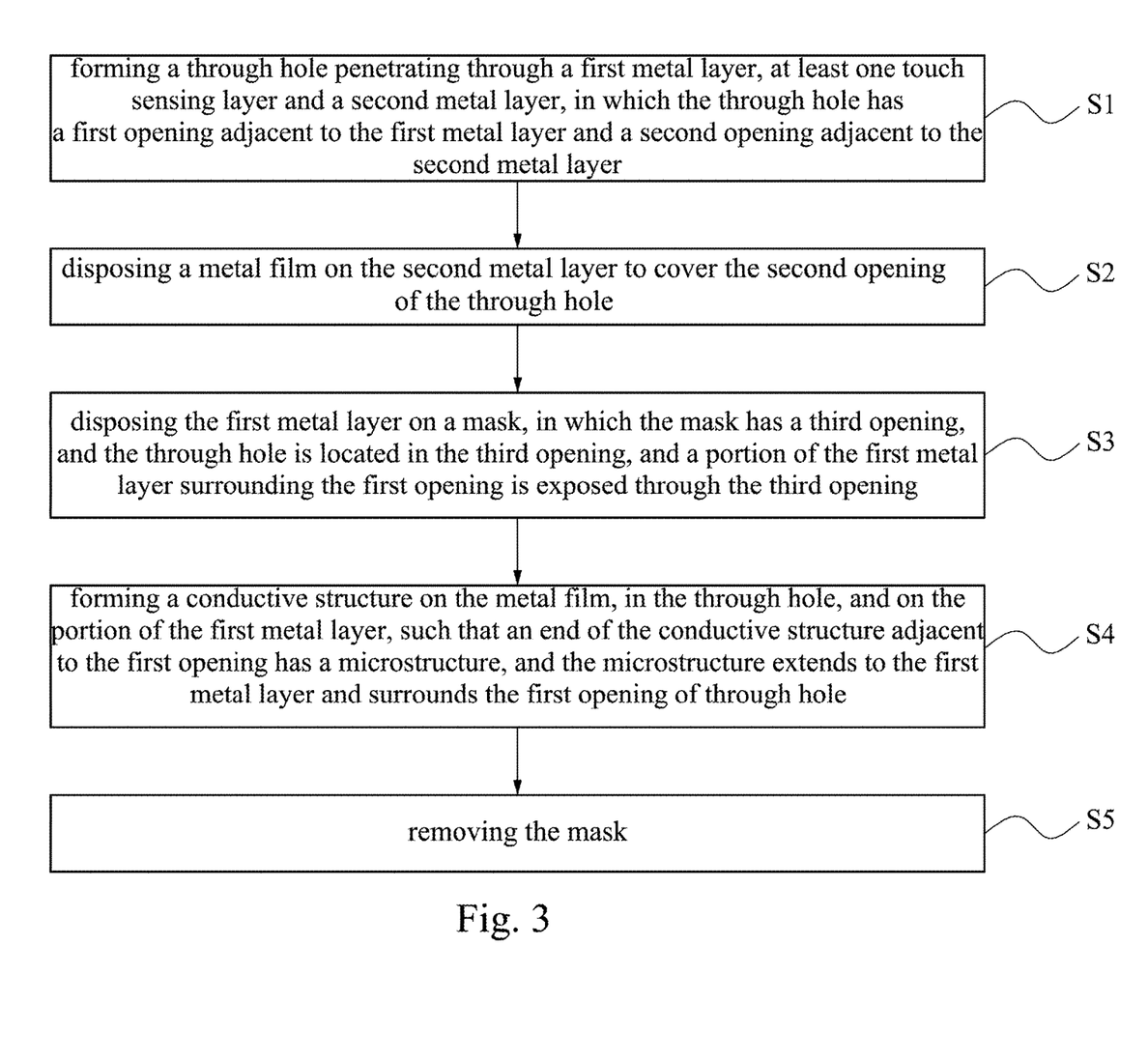
FIG. 3 illustrates a flow chart showing a manufacturing method of a touch panel according to an embodiment of the present disclosure.

FIG. 3 illustrates a flow chart showing a manufacturing method of a touch panel 100 according to an embodiment of the present disclosure. The manufacturing method of the touch panel 100 includes the following steps.

Step S1 is performed to form a through hole penetrating through a first metal layer, at least one touch sensing layer, and a second metal layer, in which the through hole has a first opening adjacent to the first metal layer and a second opening adjacent to the second metal layer.

In step S2, a metal film is disposed on the second metal layer to cover the second opening of the through hole.

In step S3, the first metal layer is disposed over a mask, in which the mask has a third opening, and the through hole is located in the third opening, and a portion of the first metal layer surrounding the first opening is exposed through the third opening.

In step S4, a conductive structure is formed on the metal film, in the through hole, and on the portion of the first metal layer, such that an end of the conductive structure adjacent to the first opening has a microstructure, and the microstructure extends to the first metal layer and surrounds the first opening of through hole.

In step S5, the mask is removed. The aforementioned steps will be discussed in the below.

Figure 4:
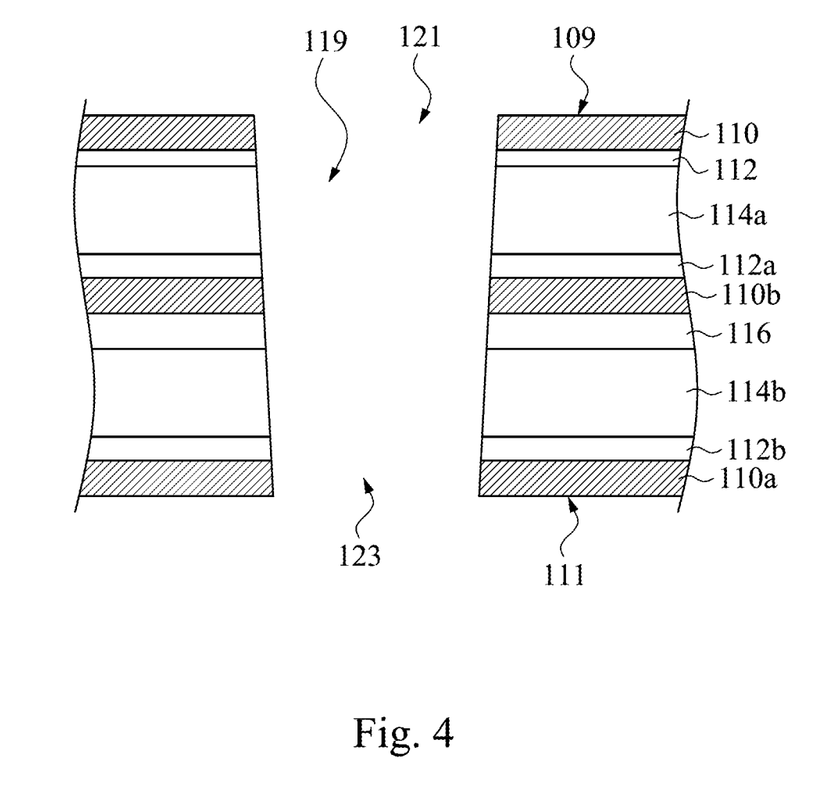
FIG. 4 to FIG. 7 illustrate cross-sectional views at various stages of a manufacturing method of the touch panel of FIG. 2.

FIG. 4 to FIG. 7 illustrate cross-sectional views at various stages of a manufacturing method of the touch panel of FIG. 2. As shown in FIG. 4, during the production of the touch panel 100 of FIG. 2, a multi-layer stack structure including the first metal layer 110, the transparent conductive layer 112, the touch sensing layer 114a, the transparent conductive layer 112a, the third metal layer 110b, and the adhesive layer 116 may first be provided. The through hole 119 penetrating through the multi-layer stack structure is formed, in which the through hole 119 has the first opening 121 adjacent to the first metal layer 110 and the second opening 123 adjacent to the second metal layer 110a. In an embodiment, the through hole 119 may be formed by performing mechanical drilling or laser drilling, but the present disclosure is not limited in this regard.

Figure 5:
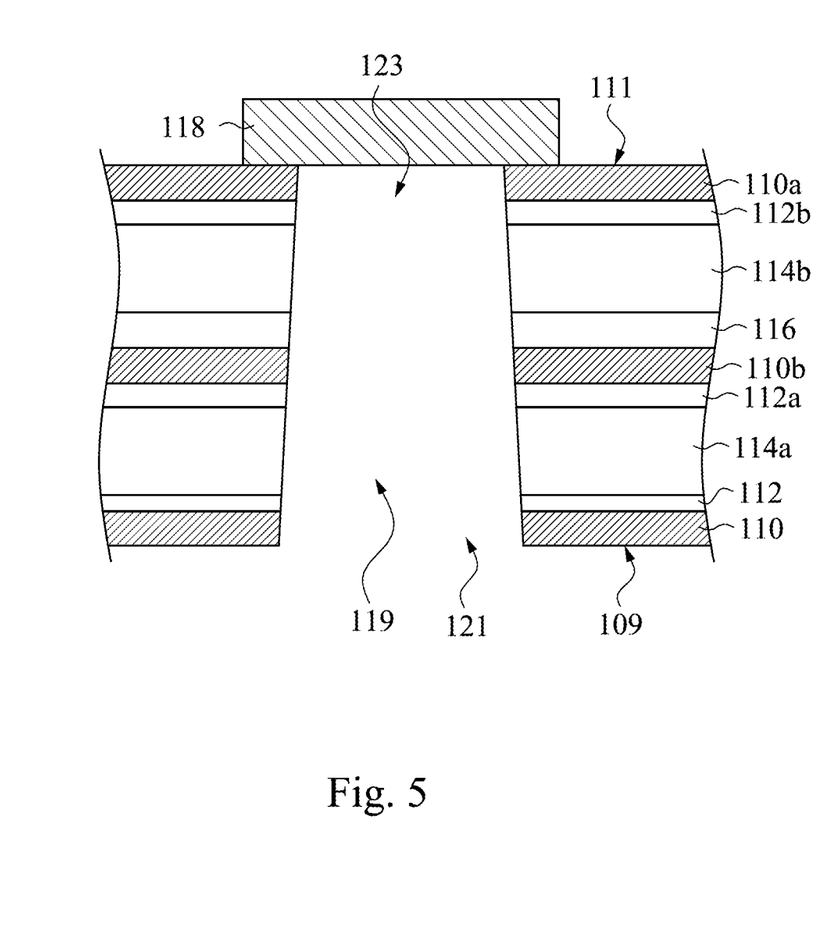

As shown in FIG. 5, after the through hole 119 is formed, the metal film 118 may be disposed on the second metal layer 110a to cover the second opening 123 of the through hole 119. In an embodiment, the method of disposing the metal film 118 may be performed by attaching the metal film 118 using a soft-to-hard machine, in which the attachment may be performed by a single metal film that covers one through hole or plural metal films that respectively cover plural through holes, but the present disclosure is not limited in this regard.

Figure 6:
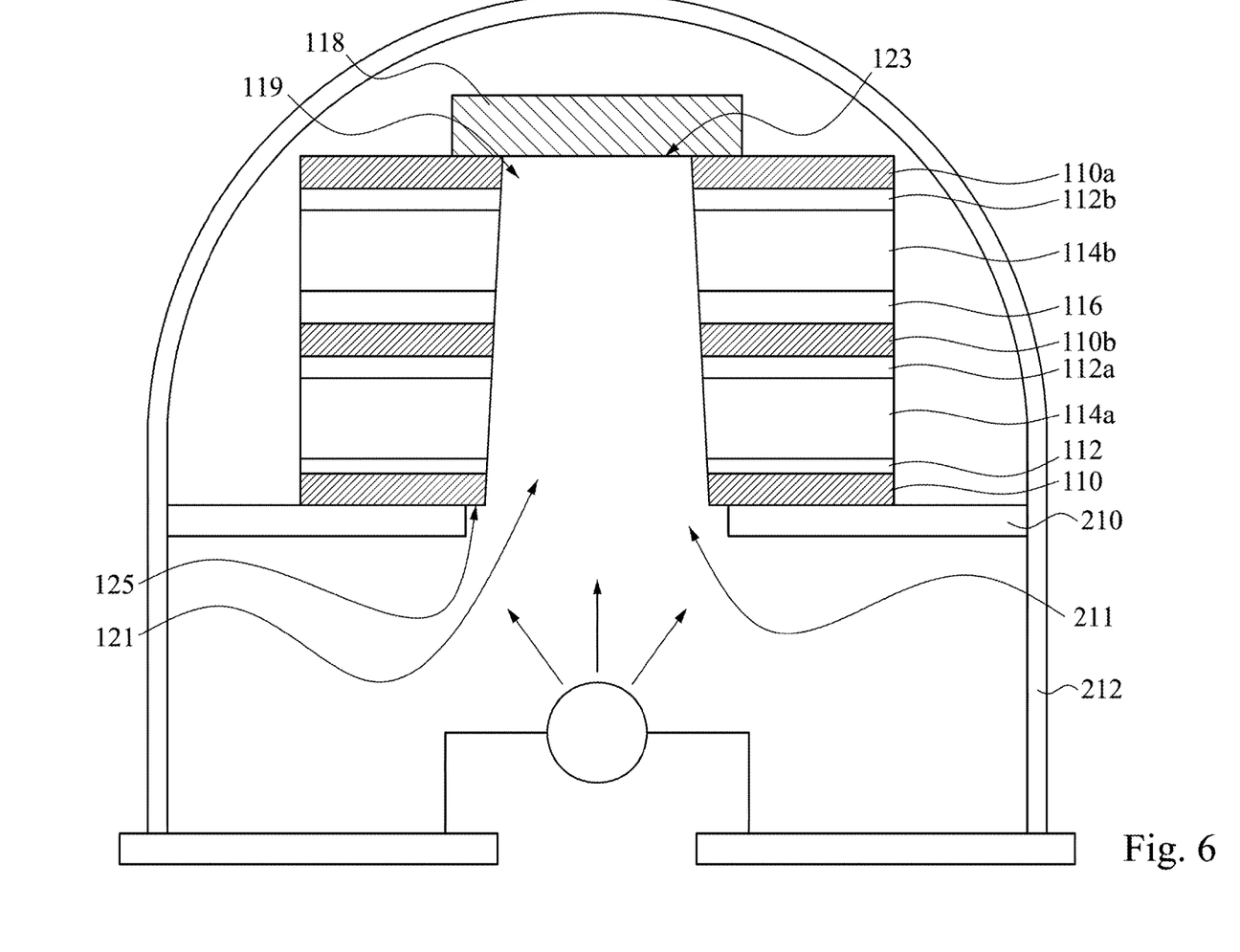

As shown in FIG. 6, after the metal film 118 is disposed on the second metal layer 110a, the first metal layer 110 of the stacked structure may be disposed on the mask 210 of a metal lid 212, such that the through hole 119 is located in the third opening 211 of the mask 210. The third opening 211 may be a ring shape, but the present disclosure is not limited in this regard. The width of the third opening 211 may be in a range from 1.5 times of the diameter of the through hole 119 to 2 times of the diameter of the through hole 119, and thus the portion 125 of the first metal layer 110 surrounding the first opening 121 may be exposed through the third opening 211 of the mask 210. In an embodiment, the mask 210 may be a precision-etch-grade metal plate (such as a 35.4% nickel-iron alloy) having a thickness of 30 micrometers and an opening accuracy of no more than ±1 micrometer, but the present disclosure is not limited in this regard. A conductive material may then be formed on the metal film 118, in the through hole 119, and on the exposed portion 125 of the first metal layer 110. In an embodiment, a material including silver and silicon oxide may be formed on the portion 125 of the through hole 119 by vapor evaporation, in which the vapor evaporation is performed, for example, at a temperature about 80° C. in vacuum. The efficiency of the vapor evaporation is about 1 micrometer/minute, but the present disclosure is not limited in this regard.

Figure 7:
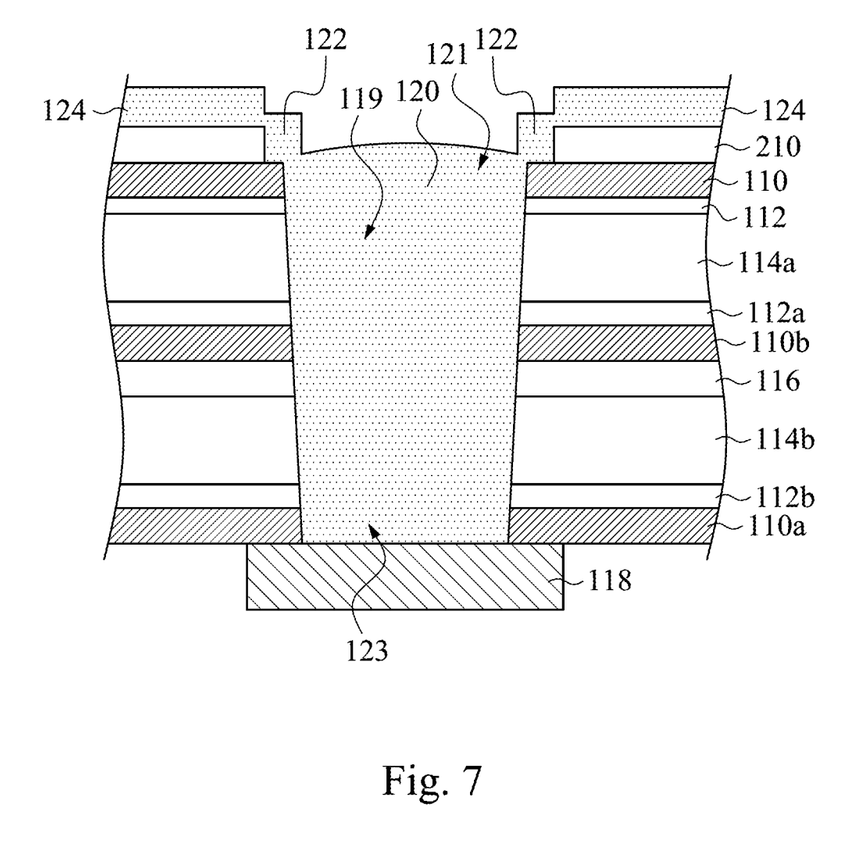

FIG. 7 illustrates a partial enlarged view of FIG. 6 after the conductive material is formed in the through hole 119. Since the conductive material is also accumulated on the exposed portion 125 of the first metal layer 110 and the mask 210 during the vapor evaporation, the conductive structure 120 has a microstructure 122 adjacent to an end of the first opening 121, and a microstructure 124 is on the metal mask 212. The microstructure 122 extends over the first metal layer 110 and surrounds the first opening 121 of the through hole 119. Subsequently, the metal mask 212 and the microstructures 124 thereon may be removed to obtain the touch panel 100 as shown in FIG. 2. The manufacturing method of the touch panel 100 can be applied to materials such as polycarbonate (PC), polyterephthalic acid (PET), cyclic olefin copolymer (COP), and the like, but the present disclosure is not limited in this regard.

Since the metal film 118 is disposed on the second metal layer 110a before the conductive structure 120 is formed in the through hole 119, and the first metal layer 110 is disposed on the mask 210 having the third opening 211 such that the portion 125 of the first metal layer 110 surrounding the through hole 119 is exposed through the third opening 211. Therefore, the conductive structure 120 not only may be formed on the metal film 118 and in the through hole 119, but also may form a microstructure 122 on the exposed portion 125 of the first metal layer 110. This method can achieve the effect of the interlayer conduction of the touch panel 100, prevent the generation of bubbles during the filling, and block off water and gas.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A manufacturing method of a touch panel, comprising steps of:
    forming a through hole penetrating through a first metal layer, at least one touch sensing layer and a second metal layer, wherein the through hole has a first opening adjacent to the first metal layer and a second opening adjacent to the second metal layer;
    disposing a metal film on the second metal layer to cover the second opening of the through hole;
    disposing the first metal layer on a mask, wherein the mask has a third opening, and the through hole is located in the third opening, and a portion of the first metal layer surrounding the first opening is exposed through the third opening;
    forming a conductive structure on the metal film, in the through hole, and on the portion of the first metal layer, such that an end of the conductive structure adjacent to the first opening has a microstructure, and the microstructure extends to the first metal layer and surrounds the first opening of through hole; and
    removing the mask.

2. The manufacturing method of the touch panel of claim 1, wherein forming the conductive structure on the metal film, in the through hole, and on the portion of the first metal layer comprises:

forming a material comprising silver and silicon oxide on the metal film, in the through hole, and on the portion of the first metal layer by vapor deposition.

\* \* \* \* \*